United States Patent [19]

Bailey

[11] 4,379,282

[45] Apr. 5, 1983

[54] APPARATUS AND METHOD FOR SEPARATION OF OPTICAL CHARACTER RECOGNITION DATA

[75] Inventor: David C. Bailey, San Jose, Calif.

[73] Assignee: Dest Corporation, San Jose, Calif.

[21] Appl. No.: 44,488

[22] Filed: Jun. 1, 1979

[51] Int. Cl.³ .............................................. G06K 9/00
[52] U.S. Cl. ........................................ 382/9; 382/54
[58] Field of Search .............. 340/146.3 SG, 146.3 H, 340/146.3 ED, 146.3 Y, 146.3 R

[56] References Cited

U.S. PATENT DOCUMENTS

| | | | |
|---|---|---|---|
| 3,164,806 | 1/1965 | Rabinow | 340/146.3 SG |
| 3,219,974 | 11/1965 | Rabinow | 340/146.3 SG |
| 3,295,105 | 12/1966 | Gray et al. | 340/146.3 H |
| 3,496,543 | 2/1970 | Greenly | 340/146.3 ED |
| 3,517,387 | 6/1970 | Andrews et al. | 340/146.3 SG |
| 3,526,876 | 9/1970 | Baumgartner et al. | 340/146.3 SG |
| 3,629,826 | 12/1971 | Cutaia et al. | 340/146.3 SG |
| 3,805,237 | 4/1974 | Cobb et al. | 340/146.3 H |
| 3,820,067 | 6/1974 | Shepard | 340/146.3 H |
| 4,045,773 | 8/1977 | Kadota et al. | 340/146.3 SG |
| 4,251,799 | 2/1981 | Jih | 340/146.3 Y |

OTHER PUBLICATIONS

Kerchmar, "Amount Line Finding Logic", *IBM Tech. Disclosure Bulletin*, vol. 15, No. 5, Oct., 1972, pp. 1531–1532.

*Primary Examiner*—Leo H. Boudreau
*Attorney, Agent, or Firm*—Michael L. Harrison

[57] ABSTRACT

An apparatus and method is described for the separation of data from adjacent characters of standard type fonts, some of which character pairs may kern or touch. Characters which do not kern or touch are separated by white column detection. Characters which do kern are first detected by a kerning test, which consists of locating white bits which separate the characters while meeting pre-established standards of contiguity. Touching characters are detected by failure to pass the white column test, followed by failure to pass the kerning test. Characters which touch are separated by a statistical analysis, which involves determination of which of several probable vertical data columns has the least number of character bits. Following separation, the characters are compared with pre-established character patterns.

4 Claims, 9 Drawing Figures

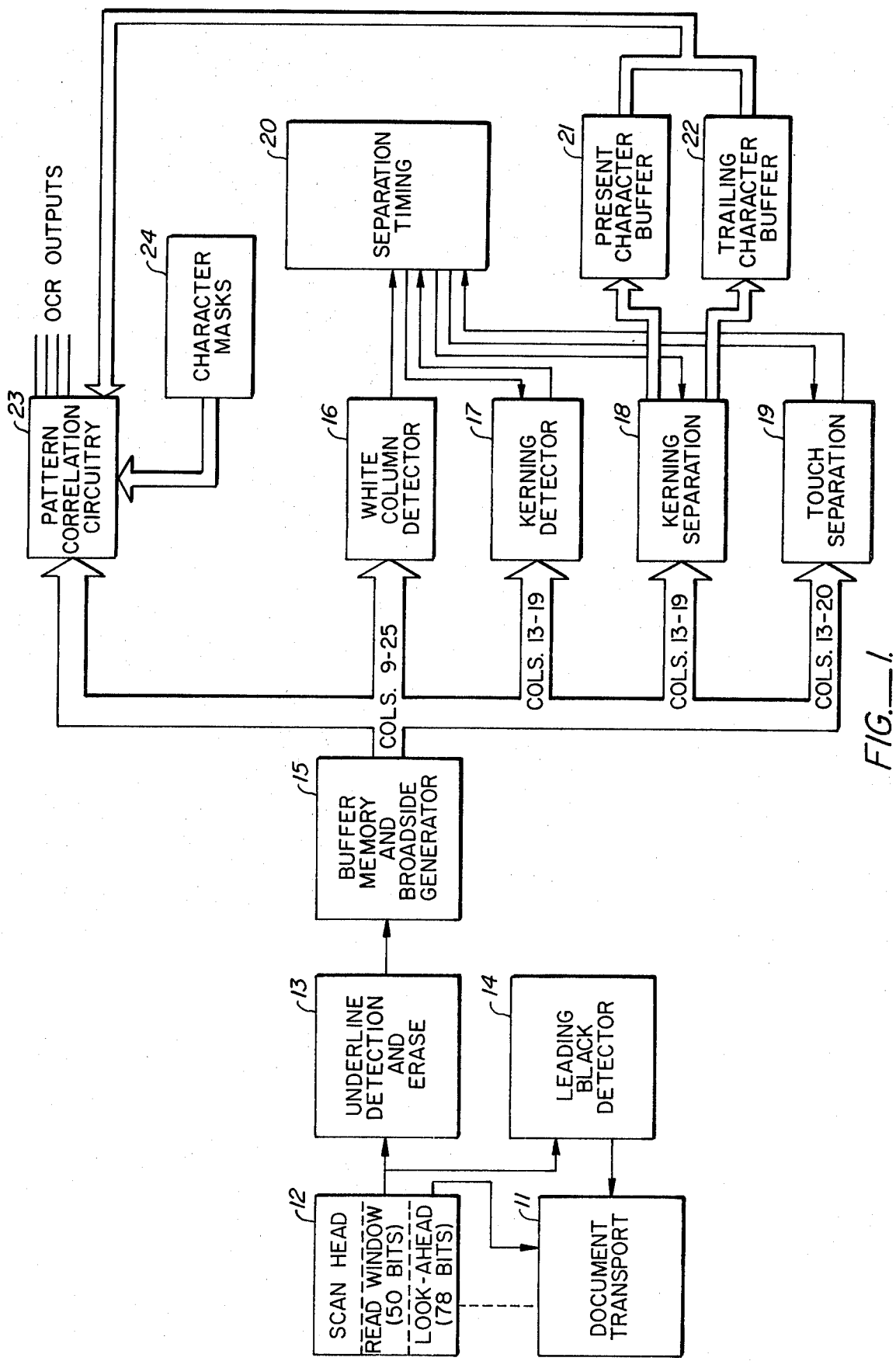
FIG._1.

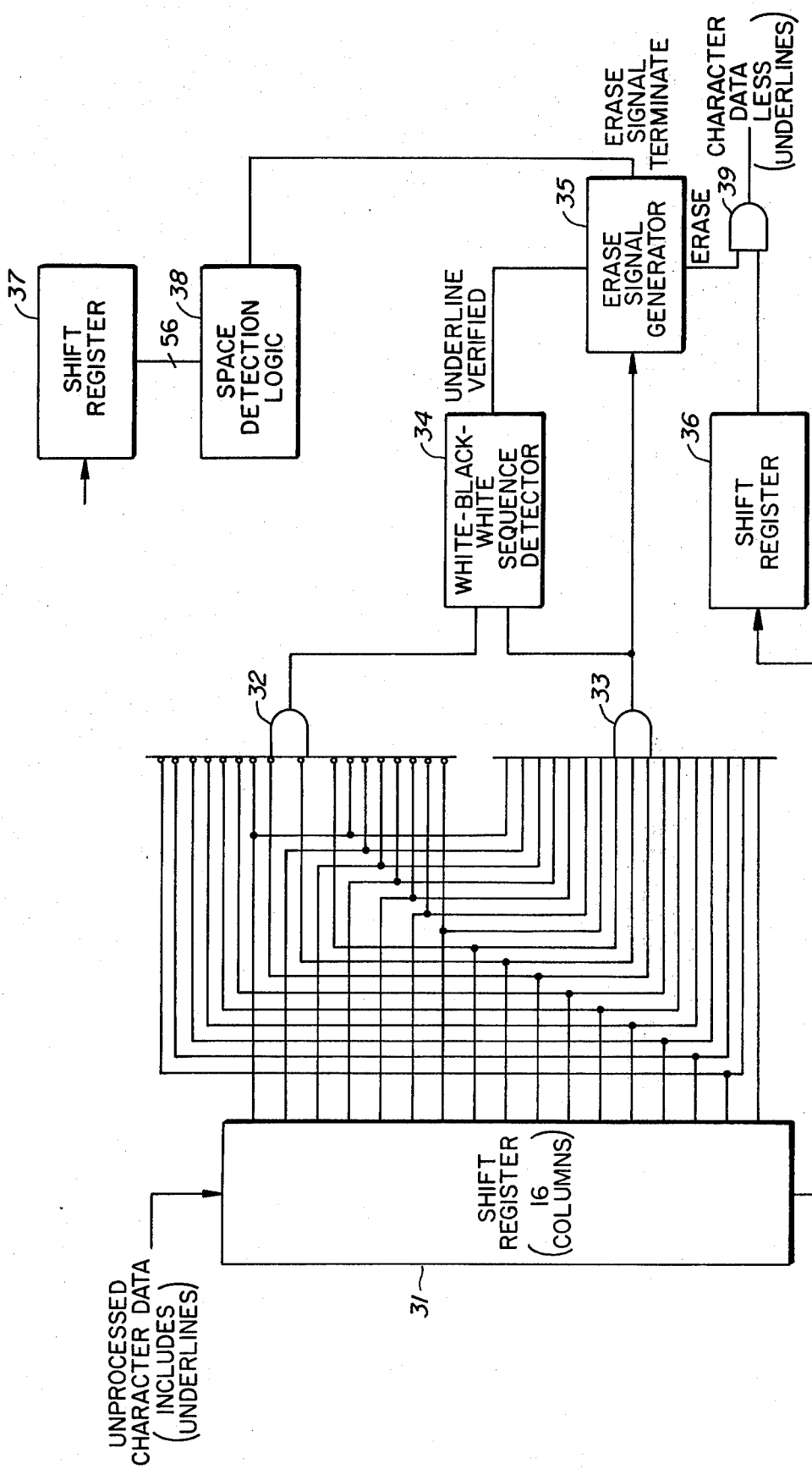
FIG._2.

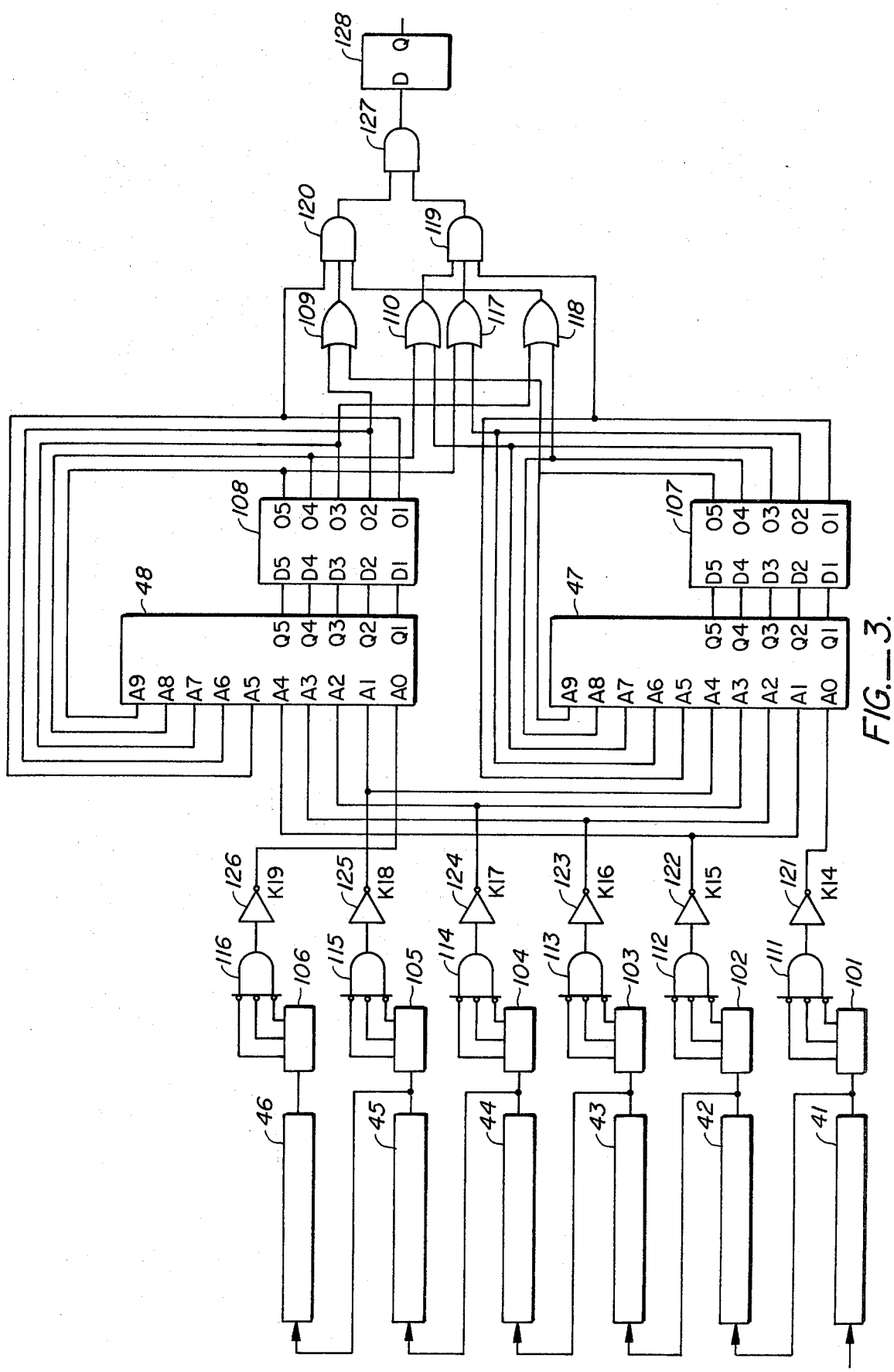
FIG._3.

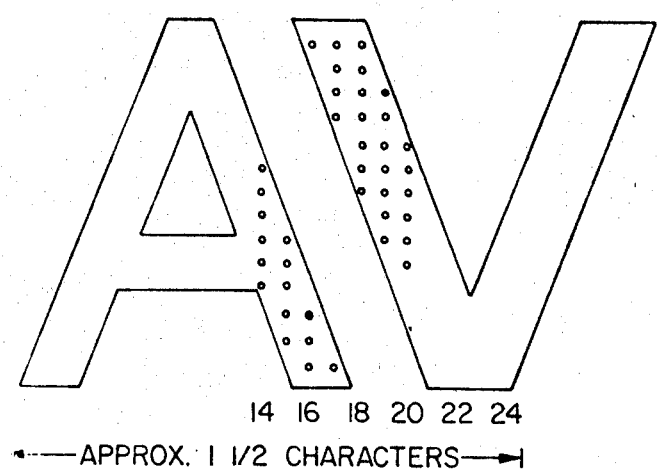
FIG._4.
FIG._6A.
FIG._6B.

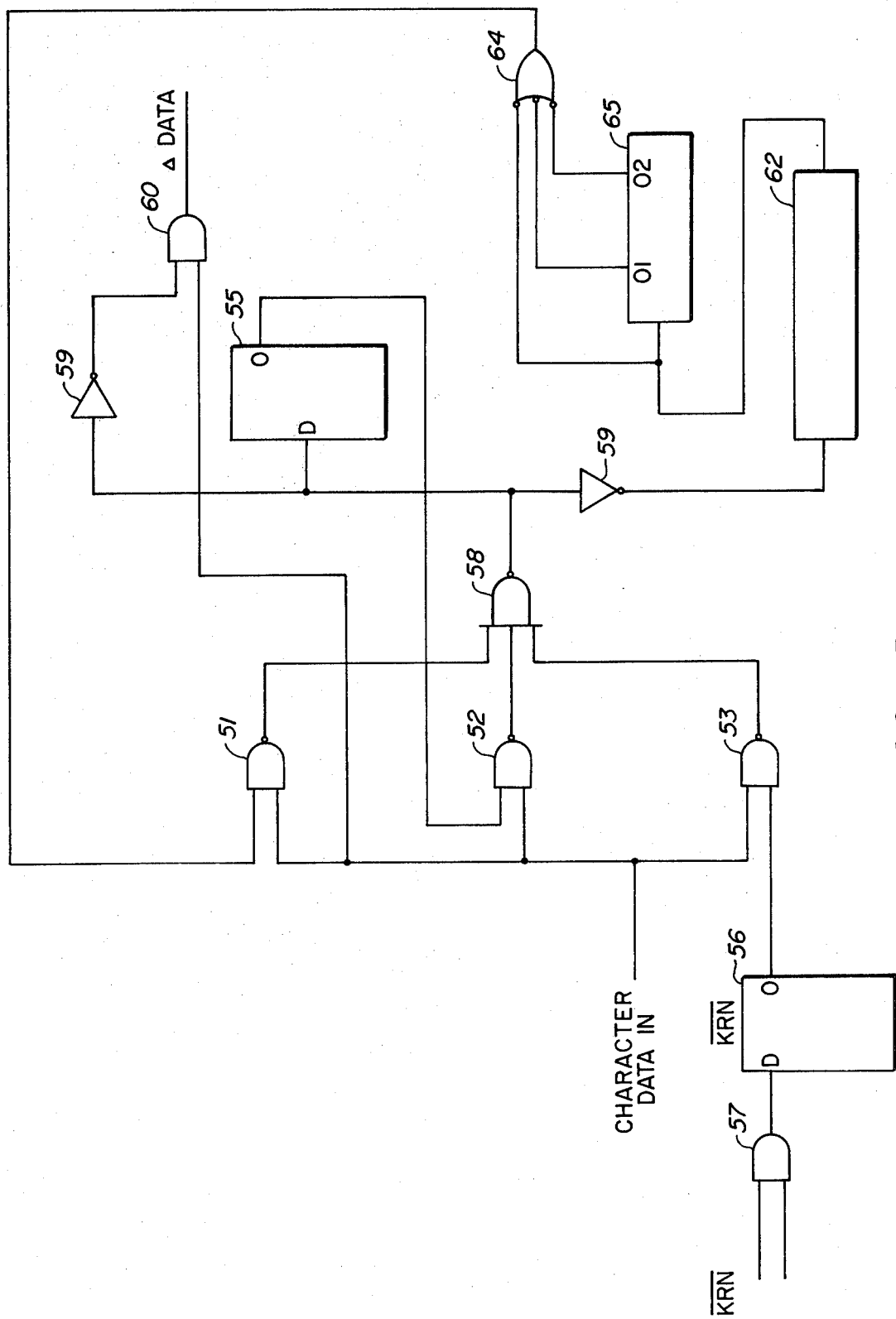
FIG._5.

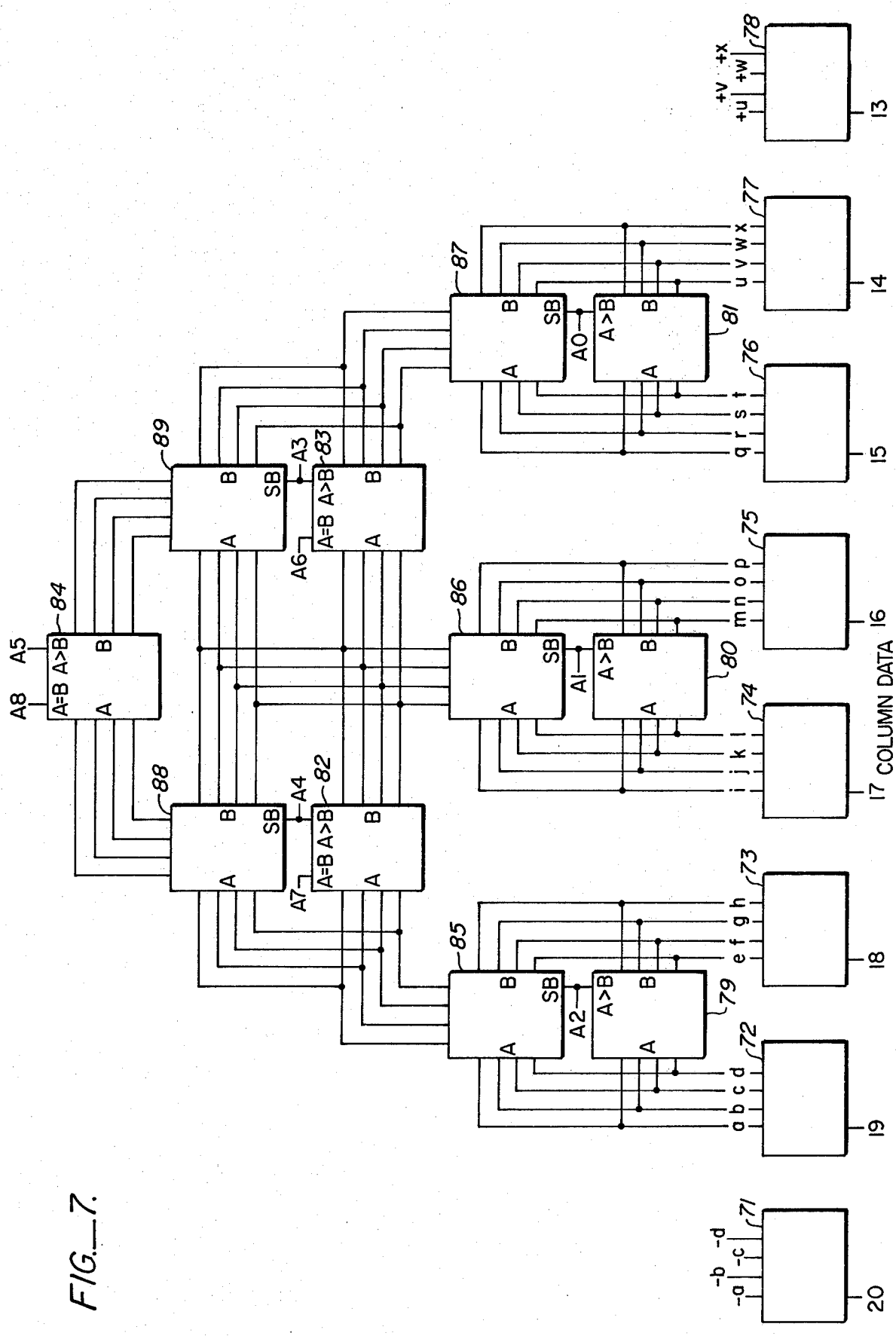
FIG._7.

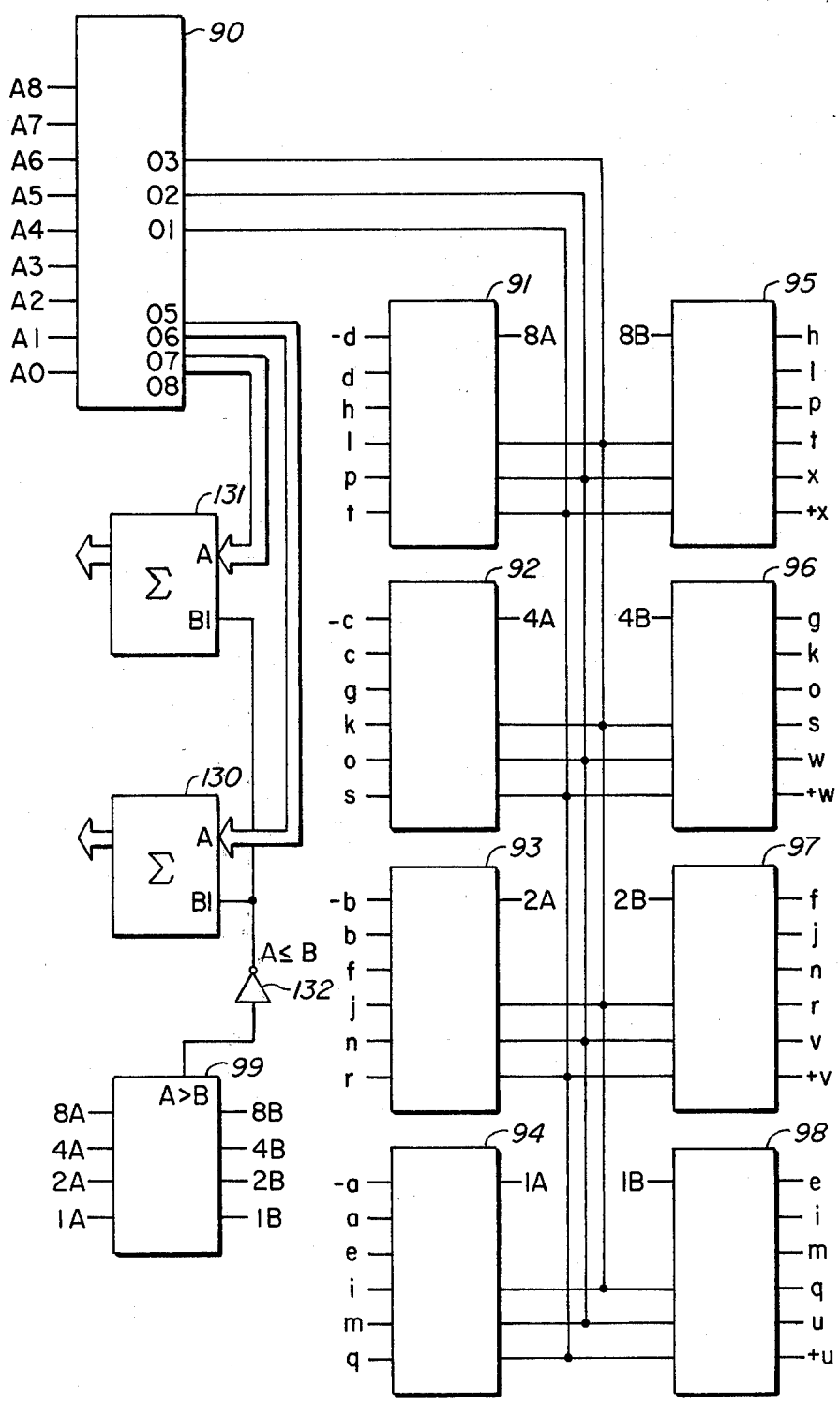
FIG._8.

APPARATUS AND METHOD FOR SEPARATION OF OPTICAL CHARACTER RECOGNITION DATA

BACKGROUND OF THE INVENTION

1. Field of the Invention

The present invention relates to the field of optical character recognition equipment, and particularly to the field of optical character recognition equipment capable of scanning and identifying characters of standard type fonts.

2. Prior Art

As the need for data inputs to data processing systems increases in volume and commercial significance, a variety of data input systems has been devised to most efficiently encode source data into machine-readable data. In addition to such standard entry methods such as key-punch, key-to-tape, key-to-disk, and remote on-line terminals, direct source data entry into a data processing system can also be accomplished by optical scanners, in particular, optical character recognition (OCR) systems. Optical character recognition equipment can dramatically reduce the labor costs of encoding data by eliminating the keyboard operation entirely. OCR equipment is potentially the fastest and most error-free method of data conversion at a lower overall cost than any of the more traditional key-punch or the newer key entry devices.

Whereas the productivity of key entry methods is limited by human skill levels which can only be improved within very finite limits, OCR equipment has a potentially unlimited character entry rate. While the costs of manual labor required for keyboard entry operations continue to increase, improvements in data entry hardware and in particular, in the processing hardware required for optical character recognition equipment continues to decrease in cost so that although initially more expensive at low volume levels, OCR equipment becomes a cost competitive technique as data volume increases.

Many OCR system readers are presently available for specialized user applications. However, a problem has previously existed as to the capability of OCR systems to recognize type-written characters from the more common standard office equipment type fonts.

Most commonly, character recognition equipment has relied upon the presence of a well-defined space between adjacent letters to provide a trigger signal for determining when a character has been identified and separated from other characters in a line.

To avoid the difficulty of recognizing character type fonts having some character pairs which cannot be easily separated or which do not readily fall into a simply recognized pattern, a number of specialized fonts have been devised particularly intended for optical character recognition use, which include all of the normal set of alphanumeric characters and special symbols found on the conventional typewriter keyboard. "OCR A" and "OCR B" are two of the more common of these specialized type fonts. The characters in both fonts are highly stylized since each character is designed to easily differentiate it completely from any other character.

Two objections to the stylized fonts are that they are not aesthetic and are not as easily read by the human eye. A more compelling objection is that their utilization requires the usage of equipment which is specially dedicated to preparation of documents having that particular type font.

The specialized OCR fonts are made to rigorously adhere to the requirement that they have no characters which kern or touch. Moreover, they are required to have a rigidly uniform character width.

A major obstacle to the recognition of non-specialized type fonts is the fact that they do contain characters of non-uniform width which do kern or touch in certain cases. This occurs rather frequently in most ordinary typewriter formats and in particular in such type fonts as Printing and Publishing 3 and Prestige Elite, both of which are in widespread use in office equipment and in publishing. Accurate recognition of individual characters requires that each character in a line of type be separated from adjacent characters so that elements of adjacent characters are not included within the character data field which is being evaluated. To the extent that characters in standard fonts do kern or touch, their recognition by OCR equipment is impaired. The difficulty of existing equipment in distinguishing and separating immediately adjacent characters which kern or touch has limited their widespread application.

Specifically, for those characters which touch, a vertical completely white column will never appear within the space occupied by two characters. For these characters which kern, i.e., overlap, but do not touch, a white space may exist between characters, but it will be non-vertical and may even be non-linear. Thus, a simple character row scan looking for vertical white columns between the adjacent letters will be futile. For equipment which is not designed to meet the contingency, erroneous character recognition results.

SUMMARY OF THE INVENTION

Accordingly, it is an object of the present invention to provide a method and apparatus for use in optical character recognition system for separating characters in a row of characters when such characters overlap (kern) or touch, so that each individual character may be separately matched within a pattern correlation circuit to make the character identification.

It is another object of the present invention to provide an apparatus and a method for separating from the text of a typewritten blank form the underlines of the form prior to a character recognition decision being made.

It is yet another object of the present invention to provide a method and an apparatus for use in an optical character recognition system for separating characters in a row of standard type fonts prior to matching of said characters in a pattern corelation circuit to make a character identification.

Briefly, the present invention accomplishes these and other objects by providing an apparatus and method for framing separate characters prior to recognition matching.

Prior to framing, a character row is analyzed to determine whether it is underlined. If so, the underline is removed to avoid the underlining having an effect on character recognition.

Separation is accomplished by first analyzing adjacent characters to determine whether they do not overlap (kern) or touch by looking for a white column between the characters. If no kerning or touching exists, the character data is forwarded for recognition matching. If kerning or touching is present, then the characters are next analyzed to determine whether kerning is present by testing for the presence of a data pattern having contiguous white bits which meet pre-established criteria. If kerning is present, the character data is analyzed to determine which parts of the data are part of the present character and which are parts of the trailing character. If kerning is not present, the character data is assumed to be touching and is separated by a statistical method which first determines the column within a group of probable separation columns which have the least number of bits, then separating the characters on one or the other of the sides of the columns in accordance with previously established criteria.

BRIEF DESCRIPTION OF THE DRAWINGS

FIG. 1 is a simplified block diagram of an optical character recognition system employing the present invention.

FIG. 2 is a simplified logic diagram of the underline detection and erase circuitry of the present invention.

FIG. 3 is a simplified logic diagram of the broadside data generator and the kerning character detection circuitry of the present invention.

FIG. 4 is a table of address inputs and outputs which illustrate the data pattern programmed into the Read Only Memories of the kerning character detection circuitry.

FIG. 5 is a simplified logic diagram of the kerning character data separation circuitry of the present invention.

FIG. 6A illustrates the data pattern which would result from the character pair "AV" when said characters are kerning.

FIG. 6B illustrates the patterns of contiguity which are acceptable to the kerning character data separation circuitry of FIG. 5.

FIG. 7 is a simplified logic diagram of a portion of the touching character separation circuitry of the present invention.

FIG. 8 is a simplified logic diagram of the remainder of the touching character separation circuitry of the present invention.

DESCRIPTION OF THE PREFERRED EMBODIMENT

Referring now to FIG. 1, there is shown a simplified block diagram of an optical character recognition system 10 employing the present invention. Documents having characters of suitable type are fed into the machine by transport 11 until a first character is visible to a "read window" in scan head 12. Scan head 12 contains a linear photosensitive array having 128 photosensitive elements arranged so that the line of the elements is perpendicular to the direction of travel of the scan head which is in a direction parallel to the row of characters being read.

Elements 1 through 78 of the array, the lower 78 elements, serve as a "look-ahead" detector which locates the position of each row of characters prior to scanning by the read window for scanning of that row. Elements 79 through 128 make up the read window itself.

Although for improved speed, character recognition is accomplished by scanning adjacent lines of characters bidirectionally, it will simplify the explanation which follows to limit the discussion to only left-hand to right-hand scanning. It will be appreciated however, that simply reversing the data field obtained when scanning in a reverse direction, will produce a data field having recognition characteristics which are the same as those obtained in the normal directions.

Scanning proceeds from top to bottom of a document. Within the "look-ahead" area of the scan head 12, line separations are completed by determining which data meets the line separation criterion of four white bits above and four white bits below a series of characters. If this criterion is not met, it is assumed that the data is a non-recognizable feature such as, for example, a logo. If so, the line separation is not made.

If no lines are found within the look-ahead area, then the document transport 11 moves the document quickly several rows upward to be scanned again by the look-ahead portion of the array.

At such time that a series of characters does meet the line separation criterion, the read window is positioned over the row so that the upper 50 photosensitive elements are scanning the characters.

Assuming now that a scan has been initiated, the system first proceeds at full non-processing speed until recognizable data is detected by the leading-black circuitry 13.

Although a single black bit could be detected and used to begin the character recognition process, it is undesirable to do so because of the possibility that spurious dark spots on a document will trigger the character recognition process, at best slowing the system down and at worst causing erroneous character outputs to occur.

To avoid the problem of responding to spurious black bits, only black bits which have adjacent black bits are recognized as valid black-bit data.

Although data is being acquired serially by a linear array and is being shifted out serially, sufficient data is available in buffer memory 15 so that an area equivalent to one and one-half characters (or 24 columns) can be viewed simultaneously. Thus, a scan of the character pair AV will result in accumulation of a data field such as that shown in FIG. 6A. An average character has a width of approximately 16 columns and a height of approximately 32 bits.

Each column corresponds to a single vertical scan of the character and contains 50 bits of data. For many purposes and most particularly for the purpose of determining where separation of the character should take place, it will be desirable to look at the same position in a number of columns at once. That is, it will be desirable to look at all bits in a single horizontal line, hereafter referred to as a "row", extending over several columns of data.

Evaluation of rows of data is facilitated by use of a buffer memory and broadside generator 15, which contains a number of serially connected shift registers each having a length equal to a single column of data. Since each register contains exactly one column, the output of each register at any given time will correspond to the data in a single row. Then, as the data is clocked through the register, the outputs correspond to the status of a row of data, taken one row at a time up through the character data field.

CHARACTER DATA ANALYSIS—General

Underlining Erasure

Briefly, character data analysis begins with an evaluation of whether the characters to be analyzed have underlining present. Generally speaking, the presence of underlining will cause erroneous recognition to occur since the underline will cause bits to appear in the character data field which are not representative of any actual characters. Since the underline may be spaced a variety of distances from the character row, it is not possible to simply add a recognition mask corresponding to characters with underlines. Thus, before suitable character recognition can occur, the underline must be first detected, then erased from the character data.

Underline detection is accomplished by the underline detection and erase circuit 13. As a row of characters is scanned, each character is evaluated for presence of 16 or more bits consecutively in the same data row. When an underline is detected, by circuitry and criteria to be described below in detail, it is continously stripped from all successive character data in the character row, until such time as a space appears in the underline. Then the same underline qualification test is re-applied to subsequent data until another underline is detected.

Separation

Character data which is free of underlines is next analyzed to determine the point of separation before data from one character and that of its adjacent character ends. As noted above, this presents no problem for OCR-designed type fonts which are deliberately designed to have uniform character widths and easily recognized spaces between each character. However, for standard office typewriter fonts such as Prestige Elite, or for other widely used fonts such as Printing and Publishing 3, significant percentages of adjacent characters are present which have either kerning or touching present. Although a majority of character pairs can be separated by detection of a vertical white column between them some cannot, and since every character must be accurately separated, it is necessary to establish and test for criteria other than merely the presence of the white column. Failure to properly separate two adjacent characters not only will cause erroneous recognition of those two characters, but will also cause erroneous placement of subsequent characters within the read window, in consequence of which an entire word or an entire remainder of a row of characters may be erroneously recognized.

Separation is divided into three steps: white column detection, kerning detection and touching detection. Based upon the relative probability that each condition will occur, the tests proceed in the order listed. Thus, if a white column can be detected, that will be the basis for making the separation at that point. If a white column cannot be detected, the next test, kerning, is performed. If kerning is detected, a method for separation of kerning character is employed. If neither a white column nor kerning is detected, then it is assumed that the characters are touching. Regardless of whether the exact point of contact of the character can be determined, they will be separated based upon a probabalistic determination of where the correct separation should be made.

Briefly, the criteria for each test are as follows:

White column—A vertical column having no black bits which have adjacent black bits must be present.

Kerning—A path of white bits consisting of groups of at least three vertically contiguous bits must exist continuously between the adjacent characters. The path followed by the groups is not required to be entirely vertically contiguous but groups of bits in adjacent columns must overlap one another by at least one bit.

Touching—Between column 13 and 19 the extreme columns of which are weighted by adding a count of three, the column having the least number of black bits is found. Separation is made on the side of that column closest to the column having the next lowest number of bits. If equal numbers of bits are found in two columns, separation is made at the column closest to the leading character. If all columns have equal number of bits, a separation is arbitrarily made between column 16 and column 17.

Although three individual tests are performed, they are performed simultaneously on the same data stream. The choice of which test determines where separation will occur depends upon which test is passed successfully. If an earlier test is found to be determinative, then later tests will not be performed.

Although all tests are performed on data which is "on-the-fly", some buffering of data is required in order to affect the separation. Until a separation point is determined, data is placed in a "present character" buffer. When separation has been established data following the column in which separation is made is routed then to a "trailing character" buffer. When a character pair has been completely separated, data in the present character buffer is forwarded to the recognition circuitry for mask matching. Data which was previously stored in the trailing character buffer becomes the present character data and the significance of the buffers changes. The next character is then evaluated until separation is made at which point the previously trailing character data becomes the leading character data for the next separation, and so forth until all characters in a line have been separated.

Data is accumulated on a character by character basis. That data which, by the separation process described above, can be conclusively determined to be the data belonging to a particular character data field, is then processed by the character recognition circuitry 15 by means of serial matching of data bits of an unknown character to those of a catalog of characters for which data pattern (mask) is already known.

Matching proceeds by determining which of possibly several matches are the best fit for a particular character. When the most appropriate match has been determined, the system outputs a digital character word in a code such as ASCII or the like.

UNDERLINE DETECTION AND ERASE CIRCUITRY

Referring now to FIG. 2, there is shown a simplified logic diagram of the underline detection and erase circuitry in accordance with the present invention. Unprocessed video which includes underline data enters shift register 31 at the least significant bit and is shifted through the register one bit at a time. When the register is fully loaded it contains 16 columns of information corresponding to the nominal width of a single character. Although only 50 bits of character data are obtained from the scan head, column data is organized into 64-bit words in order to more readily fit into standard digital logic format. Since each column contains 64 bits, the total shift register length is 1,024 bits. Every 64 bits, or every column, along the shift register's length an output is taken from the register. As data shifts through the register the 16 outputs correspond to horizontal rows of information based upon the read window model described above. The effect of looking at all of the bits simultaneously is that of detecting a row of data one row at a time moved vertically through the read window. If at any point sixteen contiguous black bits are detected then an underline is "qualified". However, until it has been "verified" it will not be stripped from the data.

Verification of an underline is based upon a test of the data to insure that when an underline is qualified it also is preceded by at least three white bits and that the black bits corresponding to the underline are followed again by white bits. If other than this characteristic is present, the suspected underline data will fail the underline verify test and will remain in the data, not being stripped out. By testing for the white-black-white sequence it is possible to insure that the data is not character data, but is truly an underline.

The presence of all white bits is detected by negative input "AND" gate 32, whereas the presence of all black bits at each of the 16 outputs is detected by "AND" gate 33. Sequencing logic for the white-black-white verification test is accomplished by white-black-white sequence detector 34, which outputs UNDERLINE VERIFIED to the erase signal generator 35. In the erase signal generator 35, the row in which the underline is detected is tabulated and stored. If an underline is then verified, an erase signal will be generated to block the transmission of black bits corresponding to the underline at each time the underline data appears in a serial column. For insurance, all rows below the underline are also stripped of black bits. Shift register 36 provides temporary storage and delay of the signal until the underline verification can be completed. Within the erase signal generator 35, a ring counter, or equivalent, is synchronized to the column data to generate the desired erase pulses every 64 bits at the appropriate row within each column. When the position of the underline is determined, the position of the underline erase pulse is fixed in the counter and is recirculated until ERASE SIGNAL TERMINATE stops the process.

ERASE SIGNAL TERMINATE is generated by the appearance in the underline data of a space three which is defined for this purpose as the existence of 8 horizontal white bits.

The presence of descenders, i.e., portions of the character which fall below the nominal line of the character row, may cause the white-black-white test to be failed. It is permitted, however, that up to three descenders in a row can be present without disqualifying the underline. This criterion is based upon the statistical improbability of words having more than three descenders in a row. Words having even three descenders in a row such as "Egypt", "gypsum" and the like are rare, but those having four are virtually unknown. Accordingly, the underline verify test, that is the white-black-white sequence detection test can be made quite rigorous without the probability that a large number of descenders in a row will occur causing erroneous disqualification of an underline.

To accommodate up to three descenders in a row, data equivalent to these characters is stored while the underline qualification and verification tests are being performed. Then when the valid underline is detected, erasure begins at a position in the data equal to three characters prior to the position at which the underline was first detected in order to insure that if an underline had been present, but had not been verified due to the presence of descenders on each of the three characters, it will nonetheless be erased. In the unlikely event that a word having four descenders in a row occurs, the underline would remain under the first character, but would be stripped out of all data occuring thereafter until a space occurred. The presence of the one character having an underline may or may not cause an erroneous recognition of that character to occur. However, as noted, the probability of such a sequence of letters occurring is remote.

KERNING DETECTION AND SEPARATION

Kerning Detection

As noted above, within those type fonts which are not specifically designed for OCR use, the presence of kerning in adjacent characters frequently occurs. The term "kerning" refers to the overlapping of a portion of one character with that of another so that a vertical line which nominally bisects the characters actually touches both characters. In other words, a completely clear white column which is perpendicular to the nominal line of the characters cannot be found. Thus, the simple white column separation process cannot be employed. However, if the characters merely kern, that is, they do not touch, then a white path separation process may be employed, and desirably will be employed since it will yield the most accurate results. But instead of attempting to detect a vertical white column path, the path which is detected may be skewed or perhaps even curved in order to accommodate the overlapping of the two characters.

It will be recalled that the kerning test is only employed after a white column test has been performed and found to be insufficient to separate the characters, which leaves only the possibilities that the characters are either kerning or touching. The next test, accordingly, is to determine which of the two is occuring, i.e., whether they are kerning or they are touching. Since separation of the characters by means of finding a clear space between the characters is more exact than the statistical method which must be employed for characters which actually touch, it is desirable to perform the kerning detection test next.

Referring now to FIG. 4, there is shown a simplified logic diagram of the kerning detection circuit in accordance with the present invention. Character data from columns 14 through 19 is shifted through a long shift register consisting of six 64 bit registers, 41 through 46. Each of the shift register's outputs feeds the input of the succeeding shift register so that at any one time the outputs reflect the data in every 64th bit of a serial data chain.

The array of shift registers creates row data which is presented at their outputs one row at a time. It, and similar shift registers used elsewhere in the system, are referred to as "broadside data generators". Broadside data from columns 14 through 19 is presented to a series of six serial-entry, parallel-access, three-bit shift registers, 101 through 106 corresponding to columns 14 through 19 respectively. Each three bit shift register is associated with a three-input, negative input "AND" gate, numbers 111 through 116, each output of which in turn is fed to an inverter, numbers 121 through 126. Since data in the shift registers at this point has a positive significance, that is "1"'s correspond to black bits and "0"'s correspond to white bits in the original character data, the input conditions to the negative-input "AND" gate require, in order for an output to be obtained from the "AND" gate, that all three inputs be "0"'s. This means in turn that within the three-bit shift registers at the time that an output from the "AND" gate is obtained the character data be all white. This, still in turn, reflects the requirement that in order to get data beyond the negative input "AND" gates, there must be three contiguous bits of white data in a vertical row in the original character data field. When this condition is met, the output from the "AND" gate becomes a "1", which is applied to the input of the inverter. The inverter output is then a "0", reflecting the fact that the data of interest is, in fact, white.

Data outputs from the inverters having been preconditioned by the requirement that three vertically contiguous white bits exist before the data will be recognized, are now referred to as "K DATA". K DATA corresponding to columns 14 through 19 as referred to K14 through K19 respectively. The K DATA for columns 14 through 19 provide the initial inputs for address inputs A0 through A5 of the two identically programmed 1K Read-Only Memories (ROM) 47 and 48, e.g., Intel 2708's or equivalent. As will be described, the programming in the ROM's is intended to provide a strict test of whether characters are kerning. A rigorous test is required to be applied at this point in order to avoid mistakenly separating characters which actually touch. Thus, it is initially required that there exist contigually three vertical white bits before kerning character data is even recognized by the "ROM".

Outputs Q1 through Q5 of the ROM's are provided to inputs D1 through D5 of two identical five bit latches 107 and 108. The outputs of the latches in turn are fed to address input A5 through A9 of each prom. Data which initially appears at the output of a ROM is, one system clock pulse later, clocked into the latch and becomes an address input for the ROM on the following row of K DATA bits. Thus, after the first row of data has been clocked through, each ROM is receiving a ten bit address, one-half of which is comprised of data from the present row of K DATA bits, and one-half of which is comprised of the output of the ROM for the previous row of K DATA bits.

Referring now to FIG. 4A, there is shown a table of address and output conditions for five possible input conditions of the ROM. Generally speaking the ROM must be programmed so that if a black bit appears at any position in the addresses it will also appear at the same position in the output. In addition, however, other black bits may appear in the outputs depending upon the states of previous addresses. As noted above, the previous output of each ROM is latched and applied to inputs A5 through A9. A part of each successive new group of data at the address inputs of the ROM's, therefore, is a composite of the present row data, plus outputs which were determined by the status of the previous row, plus its previous row, and its previous row, and so forth.

Considering the specific cases shown in FIG. 4A first, for a black bit which appears in column 14, an "1" output from the ROM at Q1, will result.

For a black bit in the ROM address at column 15 a "1" will appear at Q2. In addition, however, the bit at output Q1 may be a "2" if either the present address contained a black bit at that position or the previous address had indicated page 1, 3, 5, 7, D or F in the ROM.

For a black bit at column 16 of the input address, a ROM output will be seen at Q3. In addition, the two bits within area (2) on the output diagram, may be black bits ("1"'s) if columns 14 and 15 of the present address contain black bits or if the previous row contained those two black bits, i.e., if the ROM is directed to page 3, 7, B or F.

Similarly for column 4, the bits in area (3) will be high if present in the address or if the previous row directed to ROM to page 7 or F.

Again, similarly, for condition 5, the bits within area (4) may be black if either the present address contains black bits in columns 14, 15, 16 or 17, or if the previous row was an F.

The effect of the latched and recirculated previous row data in conjunction with the programming contained in the ROM is to fill in the output bits with "1"'s whenever there has been a history of ones at those columns for previous rows. The presence of a continuous row of black bits behind the outward most bit, i.e., the bit farthest to the right on the data pattern shown, conclusively determines that the farthest bit is a part of the present character since it is required that the present character have at least some bits in column 14. If bits never appear in column 14, it would be impossible to verify that the bits in columns 15 and above are part of the present character. Rather, that condition would indicate that the bits are either a part of the trailing character or are spurious marks which are not properly recognized as a character at all.

As noted above, both ROM's are programmed with identical data patterns. However, ROM 47 is the trailing character "ROM", receives input addresses which are opposite in significance to those applied to ROM 48, to present character ROM. Furthermore, the address and input of ROM 47 are supplied with K DATA which are displaced by one column to the right of those addresses which are applied to ROM 48. Thus, ROM 48 sees K DATA from columns 14 through 18 on address inputs A0 through A4, whereas ROM 47 sees K DATA inputs from column 15 through column 19 on addresses A5 through A0, in that order. The effect of reversal of the address bit significance is that the trailing character ROM looks for bits which are contiguous with the trailing character rather than the present character and, thus, establishes black bit contiguity in the data pattern at the output of the ROM's on a right to left hand basis in the sense of the data depicted in FIG. 4A. By requiring contiguity with the right hand data column, it can be verified that bits extending into the kerning separation field from the right hand side are contiguous with the trailing character rather than the leading character.

At the output of the latches 49 and 50, there is an array of "OR" gates and "AND" gates which are employed to verify when the outputs of the ROM reach a condition whereby contiguous bits from the present character ROM 48 touch or overlap with contiguous bits from the trailing character ROM 47. If that condition exists, the kerning test has failed. It has been determined that the characters are not kerning, and that kerning separation will be impossible.

Kerning Character Separation

When it has been definitely concluded that a pair of adjacent characters are kerning, then a separation of the bits corresponding to each character is undertaken. The character which is first encountered in a kerning pair is referred to as the "present" character while the character which follows in time and which overlaps the present character will be referred to as the "trailing" character. Since bits from both characters may appear in one or more columns of data, in separating the two characters it is necessary to keep all of the bits which are associated with one of the characters within that character's data field, while at the same time eliminating those bits from the data field of the character which is kerning with the first.

Referring to FIG. 6A, a pattern is shown which corresponds to the black bit data pattern which would result from scanning the two adjacent letters "AV" which characters are shown in outline. Assuming that character "A" is the present character, while character "V" is the trailing character, it will be desirable to put all of the character "A" data bits into the present character buffer, and all of character "V"'s data bits into the trailing character buffer. It will be noted, however, that the bits associated with "A" in some cases appear within the same data column as those associated with "V".

Referring now to FIG. 5, there is shown a simplified logic diagram of the kerning character separation circuitry of the present invention. CHARACTER DATA enters the circuit and is applied to an input of each of the two-input NAND-gates 51, 52 and 53. Data will not pass through any of the three gates until they are enabled. The circuit is initialized however so that shift register 62 contains all "1"'s and flip-flop 55 is reset so that input 1 of gate 51 and input 1 of gate 52 both are disabled. Similarly, when the circuit is initialized, flip-flop 56 is reset so that its output is "0" disabling gate 53.

In response to signals generated by the kerning detection circuitry described above, $\overline{KRN}$ is applied to gate 57 and clocked through into flip-flop 56 whenever a character pair is detected to be kerning. The signal is applied at the beginning of a data column.

Assuming now that kerning characters have been detected and a $\overline{KRN}$ signal has been applied causing flip-flop 56 to enable gate 53. The next data bits from CHARACTER DATA will now be clocked through gate 53 in synchronism with the system clock SCK. At this time, inputs 1 and 2 of gate 58 are enabled, thus allowing CHARACTER DATA to pass through the gates to the output of gate 58. Since two inversions of the data have occured, the output of gate 58 is the original character data un-inverted. The controlled data at the output of gate 58 will be referred to as KD.

KD is applied to the input of inverter 59 and inverter 60 as well as flip-flop 55.

The logic sequence which follows is intended to detect data bits which are either vertically or horizontally contiguous to bits which are part of the present character data field. Those which are not contiguous are deemed data bits which are a part of the trailing character data field.

Considering first, the case of vertical contiguity, data bits in KD are applied to the "D"-input of flip-flop 55. The input at D is clocked through flip-flop 55 in synchronism with system clock SCK. The output of flip-flop 55 is thus KD delayed by one clock pulse, or KD(−) 1. The output of flip-flop 55, KD(−) 1 is applied to the input 1 of gate 52. Any data, therefore, which appears at input 2 of gate 52 will be passed by the gate if a bit previously had been passed, regardless of the state of the input of the other two gates 51 and 53. Since these bit pairs, if any, reflect bits which are adjacent within a column of data, data bits which are vertically contiguous are pressured and are transmitted through inverter 60 and gate 61 as CHARACTER DATA.

KD is also applied to inverter 59 which in turn provides inverted KD ($\overline{KD}$) to 63-bit shift register 62. The inverted data has the opposite sense of the original, that is, black bits are reflected as "0"'s and white bits as "1"'s. A two-bit, serial-entry, parallel-access shift register 65 receives the output of the 63-bit register 62. Since columns of data are organized into 64-bit increments, the data at the output of register 62 is KD after 63 bits of delay or KD(−) 63. Thus, at any given moment, the outputs of register 65 are KD(−) 64 and KD(−) 65 respectively, or, in terms of their columnar significance, they are as follows:

KD(−) 63 = KD after one bit less than one column of delay

KD(−) 64 = KD after exactly one column of delay

KD(−) 65 = K after one column plus one bit of delay

The output of register 62 and outputs 01 and 02 of register 62 become the inputs to triple input NOR gate 64. A black bit will appear as a "0" at any of these inputs and, accordingly will cause the output of gate 64 to become a "1". Thus, gate 64's input conditions are satisfied, gate 51 is enabled, and CHARACTER DATA will appear at the output of gate 51 if there is a black bit either horizontally or diagonally contiguous in one column later then the present bit in CHARACTER DATA.

Moreover, the logic is reflexive and the presence of a bit in the present character data will cause that bit plus any other bits contiguous to it in the same column to become part of KD, which in time becomes the basis for further contiguity tests, one column later in time.

When no remaining contiguous bits are present in the same or in adjacent columns, register 62 and flip-flop 55 receive all white bits causing no further bits to be kept in CHARACTER DATA. At that time, CHARACTER DATA ceases by virtue of KD no longer enabling gate 51. There still may remain, however, additional black bits in columns still associated with the kerning pair. Since it is now known that these bits are not contiguous to other bits within the present character data field, it can be concluded that they properly belong to the data field associated with the trailing character. Accordingly, they will be routed by multiplexer 63 into the trailing character buffer. When a character pair has been completely separated, the present character's data field is sent on to the mask circuitry for pattern recognition.

In FIG. 6B there is shown a pattern of bits which will satisfy the contiguity test established by the circuit of FIG. 5. As may be seen by inspection of the patterns, bit by bit contiguity may be obtained by means of any combination of horizontally, vertically or diagonally contiguous bits. Thus, contiguity may result from column to column by means of a single pair of bits. For so long as contiguity with the present character's data field is maintained, input 2 of gate 61 will remain enabled causing CHARACTER DATA to be forwarded to the present character buffer.

By the method employed, i.e., testing for contiguity of horizontally, vertically or diagonally related bits in the character data field, the bit groupings associated with each character may be rigorously determined and any pair of kerning characters may be reliably separated prior to matching.

TOUCHING CHARACTER SEPARATION

After it has been determined that neither the white column test nor the kerning detection test can be employed as a separation criterion, the third and last possibility, touching separation, is employed. Since a positive test, such as the presence of a clearly defined white space between the adjacent letters is not met by touching characters, a statistical determination of the separation column must be employed instead. Since probabilities rather than certainities are relied upon, it follows that touching character separation is the least exact of the separation methods. Accordingly, it is placed last in the test series and is relied upon only when the more accurate methods have failed.

Referring now to FIGS. 7 and 8, there is shown a touching separation circuit in accordance with the present invention. Counter and magnitude comparators in the circuit select that column within columns numbers 14 through 19 where the least number of black bits is present. When the column having the lowest number is detected, a separation is made on the side of the character closest to column 13.

Details of the circuit operation may be understood by first referring to FIG. 7. Column data from column 13 through 20 is presented to an array of identical 4-bit binary counters 71 through 78. Column data is obtained from the broadside row data generator as described above in the Kerning Detection section and, as noted, results in horizontal rows of data being presented to the counters all bits simultaneously.

Each counter can count to a total of 15 before its output is fed back to permanently latch the data until the frame of data corresponding to the entire length of the column has been completely cycled. Although the counters are identical, the counters associated with extreme of the columns are artificially weighted by adding an initial count of three through the parallel set inputs prior to the count being commenced. By artificially weigting the data, it is possible to bias the column selection toward the intermediate column numbers, a choice which is preferred based upon the statistical improbability that a character pair will be separated at one of the extreme columns.

When all columns have been clocked through for counting the black bits counted by each counter are held momentarily. Four-line binary data from columns 14 through 19 is then applied in pairs of columns to magnitude comparators 79 through 81 and simultaneously to multiplexers 85 through 87. The higher number column is always input A to both multiplexer and comparator while the lower number column is always input B. An output from each comparator is obtained when the input data to side A of the comparator is greater than that of side B. The comparator output in turn enables the SELECT B input of the multiplexer. Thus, for those cases in which the column corresponding to input B is less than that corresponding to input A, column B data is passed through to the next tier of comparators 82 and 83 and multiplexers 88 and 89, at which point a selection is again made between the data groups selected by the previous multiplexer/comparator combination, by process similar to that described above. Outputs are eventually applied to comparator 84, which makes a final determination, and provides an output corresponding to A>B or A=B. Since comparators 84, 82 and 83 all have both A=B and A>B outputs, and since outputs for A>B are available from comparators 79, 80 and 81, an exact determination of the column having the lowest count can be made.

In cases where a tie as to lowest count results between adjacent columns, a decision is made to select the column for separation which is closest to column 13. Thus, if a tie between column 15 and 16 is detected then column 15 will be selected for separation, i.e., column data from 15 will be considered to be that of the trailing character and all columns previously, i.e., up to column 14, will be considered to be that of the present character.

Decision making logic for determining which of the columns has the lowest count is located in Read Only Memory 90 in FIG. 8. Signals A0 through A8 from FIG. 7 are supplied to address inputs A0 through A8 respectively. Within the ROM, two sets of information are contained, the first a corelation between the address data and the number of the column having the lowest number of black bits, the second a corelation between the address inputs and a set of three-bit outputs for selection of data through multiplexers 91 through 94.

Outputs 01, 02 and 03 from the ROM supply an address bus to the eight multiplexers, 91 through 98. Data inputs to the multiplexer are obtained from the outputs of the counters 71 through 78 shown in FIG. 7. Multiplexers 91 through 94 receive data from every column from 15 through 20, while multiplexers 95 through 98 receive data for every column from 13 to 18. The data is arranged, however, so that the address bus selects data groups from every other column rather than from adjacent columns. Thus, data in column 15 for example would be compared with data from column 17. Data from column 16 would be compared with data from column 18 and so on depending upon the column at which the least number of bits is located.

From the multiplexers, two four-bit output words are selected and applied to multiplexer 99. In response to the address from outputs 01, 02 and 03 of the ROM, the multiplexer 91-98 select data from columns counter on either side of the column counter which has the lowest number of bits. A comparison is then made between the two adjacent columns to determine which of those two has the lowest number of bits present. If a decision has been made, that the greater number column has more bits, the output from A>B is applied after inversion of the B1 input of each of two address 130 and 131 causing the address outputs to be increased by a count of one. A>B inverted is logically equivalent to A≦B and reflects the determination that the higher numbers column has the greater number of bits thereby indicating that a separation should be made between the lower number column and the least count column.

An example will illustrate the process. Remembering that separation must be made between adjacent columns of data, assume that after all columns have been docked through the column counter, column 16 is determined to have a count of four black bits, column 17 a count of three black bits and column 18 a count of five black bits. ROM 90 reads the outputs of the magnitude comparators 79-84 and determines that column 17 had the lowest black bit count. It is still necessary to determine which side of column 17 the separation must be made on. Accordingly, data from columns 16 and 18 is selected by multiplexers 91-98 and is applied to the inputs of comparator 99. Column 16 is applied to the B inputs while column 18 is applied to the A inputs. Since A is greater than B, A>B is indicated at the comparator output. However, since A>B is inverted, a "0" appears at the B1 input to the address, causing their count to remain unaffected, the result of which is that all data beginning with column 17 will become trailing character data, effectively splitting the characters apart between columns 16 and 17.

If the opposite situation were to obtain, i.e., column 18 had four bits and column 16 had five bits, the magnitude comparator 99 would indicate A≦B, a zero would appear at the input of inverter 132 and a "1" would appear at its output. The "1" applied to the address 130 and 131 would increase their indicated column number output by one column causing all data beginning with column 18 to become trailing character data, effectively splitting the characters apart between columns 17 and 18.

From the foregoing, it will be appreciated that secondary magnitude comparisons on each side of the extreme columns will be required for those cases in which the extreme column, i.e., 14 or 19 have the lowest count. Then, counter 71 and 78 are required to 71 count bits from column 20 and 13 respectively.

Although a specific embodiment of the present invention has been described, it will be apparent to those skilled in the art that a great many variations of the invention may be practiced without departure from the scope of the invention taught and claimed in the following claims.

What is claimed is:

1. In an optical character recognition system of the type having a scanner for sequentially viewing the character in a line of type, some of which characters may be underlined or kerning or touching and generating a digital data field having data bits which are representative of vertical columns and horizontal rows of black and white image values of said characters, and having digital storage means for accumulating columns of said data and digital comparison means for comparing the data with patterns of known characters for the purpose of identifying the characters being scanned, an apparatus for separating character data prior to recognition, comprising:

white column detection means for determining when a continous vertical column of white bits appears within the data field of two adjacent characters;

kerning detection means for determining when a path of contiguous white bits extending from the bottom row to the top row of the character data field of two adjacent characters exist;

kerning character separation means for determining which data bits within the data field of two adjacent characters should be grouped with the first character and which data bits should be grouped with the second character;

touching character separation means for determining the column having the lowest black bit count within a group of data columns located in the area of the data field of two adjacent characters having the greatest probability of being the area in which the two characters touch; and means responsive to the white column detection means and the kerning character detection means for first evaluating whether a white column can be detected, and if so, for outputing a signal defining the column at which the separation of the character must be made, and if not, for next evaluating whether kerning character can be detected, and if so, for outputing a signal to the kerning character separation means to provide separation of the data bits for each character by said kerning character separation means, and if not, for outputing a signal to the touching character separation means to provide separation of the two adjacent characters by said touching character separation means.

2. The method of separating character data of a first and second adjacent character in a data field having vertical columns and horizontal rows of black and white bit data representative of the image of characters in a horizontal row of type, comprising the steps of:
   a. evaluating vertical columns of data to determine whether a column having all white bits exists at the area of the character data most probably including the midpoint of the two characters and if so separating the data on either side of said column;
   b. if a vertical white column does not exist, next evaluating the character data to determine whether a continuous path of white bits exists having minimum contiguity of a first plurality of bits vertically and a second plurality of bits horizontally;
   c. if a continuous white column exists, separating the data in each data row on either side of the path by determining which black bits within a row are contiguous with black bits in the same row, one row above or one row below in the adjacent column and which black bits are contiguous with black bits just above or below with the same data column and storing all of said bits with data from the first character and storing all remaining bits with data from the second character;
   d. if neither a vertical all-white column nor a continuous white bit path having the required contiguity pattern exists, next counting the number of black bits in each of a selected group of adjacent vertical columns selected to be in the vicinity of the character data which most probably includes the midpoint of said adjacent character;
   e. adding to the count of the extreme column in the group of adjacent vertical columns a preselected number;
   f. determining among the black bits count for each column including the added counts which column has the lowest number of bits;
   g. determining which of the two columns on either side of the least count column has the lowest count, and;
   h. grouping data which is located to the side of the lowest count column on which the next lowest count column is located into data from the first character and data on the opposite side into data from the second character.

3. An apparatus for evaluating a digital data field, which field representative of a series of alphanumeric characters, some of which may be underlined, for the purpose of detecting and removing said underlining, said data field having a first plurality of columns, each column in turn having a second plurality of data bit positions, each of which positions may contain data bits representative of the presence of character or underline information, referred to as "black bits", or may contain data bits representative of the absence of character data, referred to as "white bits", comprising:
   a. digital memory means for at least temporarily storing digital data;
   b. first memory scanning means responsive to said digital memory means for sequentially scanning said first digital memory means and detecting the presence of all white bits in the same position in a pre-established number of contiguous columns, and having an output signal which indicates that such a condition has occurred;

c. second memory scanning means, responsive to said digital memory means for sequentially scanning said digital memory means for detecting the presence of all black bits in the same position in the pre-established number of the same said contiguous columns, and having an output signal which indicates that such a condition has occurred;

d. sequence detection means having inputs responsive to the outputs of said first memory scanning means and said second memory scanning means and itself having an output which indicates the detection of a sequence of output signals from the first and second memory scanning means in which an output signal from the first memory scanning means is followed by an output signal from the second memory scanning means which exists for no more than a pre-determined number of contiguous data bit positions and which is in turn followed by another output signal from said first memory scanning means;

e. memory position tabulation means responsive to the output of the sequence detection means for identifying the memory positions in which all black bits which have caused an output to occur from the sequence detection means are located, and;

f. logic means responsive to the memory position tabulation means for selectively removing from said data field all black bits which have caused an output to occur from the sequence detection means.

4. The apparatus of claim 3 wherein the sequence detection means further comprises logic means responsive to the first and second memory scanning means for determining when an output from the first memory scanning means exists for a first pre-established number of contiguous data bit positions followed by an output from the second memory scanning means which exists for a second pre-established number of contiguous data bit positions followed by another output from the first memory scanning means which exists for a third pre-established number of contiguous data bit positions, and for producing an output which indicates that this sequence has occurred.

* * * * *